Patented Oct. 26, 1948

2,452,314

UNITED STATES PATENT OFFICE 2,452,314

PLASTICIZED PROLAMINE-BASE PROTEIN COMPOSITIONS

Willard L. Morgan, Columbus, Ohio, assignor, by direct and mesne assignments, to American Maize-Products Company, a corporation of Maine No Drawing. Application March 5, 1945, Serial No. 581,190

24 Claims. (Cl. 106—153)

This invention relates to novel plasticizers for prolamines and prolamine-base proteins, and to the resultant plasticized compositions. More particularly, there are described plastic compositions, methods of forming such compositions and articles thereby secured, in which prolamines such as zein, corn protein or other cereal prolamines or their derivative proteins, are plasticized by ether-containing phenols. In such manner there may be used mono-methyl-ether-quinol, mono-ethyl-ether-catechol, 5-methoxy-1-naphthol and other similar ether-containing phenols.

It is an object of this invention to provide novel plasticized compositions of "prolamine-base" protein.

It is another object of this invention to provide novel prolamine compositions with plasticizers exhibiting highly desirable compatability and solvency for the prolamines, which permit the preparation directly of plastic masses, coatings and films with the prolamines.

It is a still further object of this invention to provide novel prolamine compositions having plasticizers for prolamines of improved compatibility characteristics which compositions may be applied in solvents as adhesives, or coatings, or thus applied in forming films or plastics.

Other and ancillary objects of this invention will be apparent from the detailed description and examples thereof hereinbelow set forth.

The prolamines have long been established as exhibiting certain properties unique among the proteins, and as such have been classified by workers dealing with proteins as a separate group thereof. By definition, the prolamines are those proteins characterized by solubility in aqueous ethyl alcohol. They are found only in cereal grains and, contrasted to other proteins, are high in the amino acid proline and amide nitrogen content, and are deficient in free amino groups and in lysine. They are very nearly or entirely insoluble in water and weak aqueous acid solutions, but are freely soluble in dilute alkali.

Although in the following description and examples reference will be made to the particular prolamine zein which is derived from corn, it is to be understood that this invention is equally applicable to the other prolamines, that is, to hordein, derived from barley; to kafirin, derived from sorghum; to gliadin, which is derived from wheat; and to the cereal glutens generally.

The diverse and potentially large-scale utilization of plasticized prolamine compositions has long been attractive, and the discovery of satisfactory plasticizers for the prolamines in general, and, in particular, for the prolamine zein which is of industrial importance, has been the object of extensive investigation. Various plasticizers for this purpose have been proposed, but most of such prior art materials have exhibited low plasticizing activity or undesirable characteristics such as incomplete compatibility, high melting point, strong odors, water solubility or rapid loss by volatilization from the prolamine, thereby, and in other ways, resulting in compositions which are unsatisfactory commercially in one respect or another.

It has previously been proposed to plasticize various proteins, including the prolamine zein, with various phenols, such for example as phenol, the cresols, the naphthols, quinol (hydroquinone), catechol, phloroglucinol, pyrogallol, resorcinol, and the like. However, these present various disadvantages: thus, for example, catechol, phloroglucinol, pyrogallol, resorcinol and quinol are extremely soluble in water, resulting, therefore, when employed as plasticizers for the prolamines, in compositions which are excessively water-soluble and consequently of but limited utility. Others of the prior art phenols such, for example, as phenol and the cresols, are undesirably volatile, thereby resulting in compositions of fugitive flexibility. The ether-containing phenols of the present invention on the other hand, are not only of very limited water-solubility, resulting in plasticized prolamine compositions exhibiting a wide diversity of applications, but are also of limited volatility and accordingly subject to negligible evaporation from the compositions in which they are incorporated, consequently imparting thereto greatly prolonged flexibility.

In this invention there is set forth the surprising discovery that ether-containing phenols having a total number of carbon atoms not in excess of 18, function as remarkably effective plasticizers for prolamines. Organic ether compounds generally have been found to be without any solvent activity upon the prolamines, and to lack plasticizing activity. Thus, methylphenyl ether and diphenyl ether are not solvents for prolamines or for zein. Likewise the dimethyl ether of resorcinol and the diethyl ether of catechol are without solvent action and without plasticizing effect upon the prolamines. It is therefore surprising that the introduction of an ether group into a phenol is found to increase greatly the solvent action and softening or plasticizing action upon the various prolamines and particularly upon zein. A further unexpected highly desirable result arises from the fact that such introduction of an ether group into the phenol molecule does not appreciably or greatly increase the water solubility of the etherized phenol as compared with the corresponding non-etherized phenol. This contrasts to the general increase in solubility which occurs when ether groups are introduced into organic compounds generally. By reason of the much higher degree of mutual compatibility and solvency of the prolamine for the plasticizer and the plasticizer for the prolamine, there is found to be an absence of tendency for the etherized acids to crystallize or sweat out from plastics made with these materials.

Generally speaking, there may be employed etherized phenols carrying either or both of alkyl and aromatic groups. There may also be employed etherized phenols in which cycloalkyl or heterocyclic groupings are present. The etherized phenols which I found to be effective plasticizers for prolamines may be represented by the general formula R'OR wherein R represents a substituted or unsubstituted phenolic radical, R' represents an organic group or radical, and O represents oxygen. By the term "phenolic radical" as employed in this invention, it is meant to indicate an aryl organic ring group having directly attached thereto a phenolic hydroxyl radical, in contrast to hydroxyls attached to aliphatic groups which are recognized as alcohols. The usable compounds may carry more than one phenolic hydroxyl group. I find, however, that when the total number of carbon atoms is increased, the activity as a solvent and as a plasticizer for prolamines generally decreases, and, in general, that those etherized phenols having more than 18 carbon atoms in the molecule do not exhibit any desirable activity in these respects. While it is apparent that the odor, water solubility, and boiling point as well as the direct compatibility and solvency will thus vary with the molecular size of the compound, it is also apparent that suitable characteristics in all of these respects may be secured depending upon the choice of the organic groupings employed in the etherized phenols. Generally, the activity of the compounds as solvents and plasticizers for prolamines is increased as the number of ether groups in the phenol is increased, although the presence of more than one ether group generally leads to increased water solubility. As hereinabove set forth, the radical R' of the etherized phenols in the present invention may be of similar or unlike nature to the phenolic radical R. Thus, for example, I have found compounds of this type wherein R' represents aryl, heterocyclic, alicyclic or aliphatic groups to be effective plasticizers for the prolamines. Further, such groupings R' may be saturated, unsaturated, substituted, unsubstituted and, in the case where R' represents an aliphatic group, straight- or branched-chain in nature. Unsaturation has been found, in general, to result in compounds which are more readily compatible with the prolamines and hence to enhance the plasticizing activity of these etherized phenols. It has also been found frequently advantageous to have present in the etherized phenol molecule aliphatic, hydroxyl or amino groups in the radical R' thereof, and in any alkyl substitution groups attached to the phenolic group R. However, such substitution concurrently results in increased water solubility of the plasticizer, and for this reason, it generally is undesirable to have present a total of more than one aliphatic hydroxyl, or one amino group, for every three carbon atoms. The etherized phenol plasticizers of the present invention may also be substituted in the phenolic radical by aliphatic groups, and in either or both groups R and R' by ester linkages, ketone groups, or halogens, but generally the presence of these ketone, halogen and ester groups has been found not to increase the plasticizing activity, but often to be slightly adverse in conferring somewhat poorer solvent effects and compatibility. In addition, etherized phenols characterized by the presence of carboxyl substituents have been found to be eminently satisfactory plasticizers for the prolamines, as more particularly set forth in co-pending application Serial No. 565,064, filed November 24, 1944, in which the present applicant is a co-inventor.

The following are typical of some of the various etherized phenols hereinabove described which have been found eminently satisfactory in the practice of the present invention:

m-Methoxyphenol (guaiacol)
$CH_3OC_6H_4OH$ p-Ethoxyphenol
$C_2H_5OC_6H_4OH$ m-Butoxyphenol
$CH_3(CH_2)_3OC_6H_4OH$ o-Amyloxyphenol
$CH_3(CH_2)_4OC_6H_4OH$ p-Octyloxyphenol
$CH_3(CH_2)_7OC_6H_4OH$ 2,6-dimethoxyphenol
$(CH_3O)_2C_6H_3OH$ 2-methoxy-4-methylphenol (creosol)
$CH_3OC_6H_3(CH_3)OH$ 5-methoxyresorcinol
$CH_3OC_6H_3(OH)_2$ 3-methoxypyrocatechol
$CH_3OC_6H_3(OH)_2$ 5-methoxy-2-naphthol
$CH_3OC_{10}H_6(OH)$ o-Lauryloxyphenol
$C_{12}H_{25}OC_6H_4OH$ 2-2'-dimethoxy-4,4'-dihydroxydiphenyl
$(CH_3O)(OH)C_6H_3C_6H_3(OH)(CH_3O)$ 2-butoxy-5-octylphenol
$(C_4H_9O)C_6H_3(C_8H_{17})(OH)$ 2-allyloxy-3-methylphenol
$(CH_2CHCH_2O)C_6H_3(CH_3)(OH)$ Ethoxyethylphenol
$C_2H_5OC_2H_4C_6H_4OH$ o-Methoxy-p-aminoethylphenol
$(CH_3O)NH_2C_2H_4C_6H_3OH$ m-(b-Hydroxy-ethyl-ether) of phenol
$OHC_2H_5OC_6H_4OH$ Eugenol
$CH_2CHCH_2C_6H_3(OCH_3)OH$ Mixtures of these etherized phenols combined in any proportions whatever with each other constitute effective prolamine plasticizers. Furthermore, I have found that naturally occurring mixtures, resulting, for example, from the destructive distillation of woods and lignins and resulting in tars, oils and the like, such as pine tars, hard wood tars, wood creosotes, and the like, and containing etherized phenols, also constitute eminently satisfactory plasticizers for the prolamines. Wood creosote is comprised primarily of phenols, chiefly of guaiacol (m-methoxyphenol). The etherized phenols may also be employed as plasticizers in prolamine plastics in combination with other known plasticizers such as dibutyl tartrate or para-toluene-sulfonamide. The amount of plasticizer which may effectively be incorporated with the prolamine to result in a useful, plasticized composition occupies an extremely broad range of percentages based on total product composition, and the amount employed will depend upon the properties desired in the plastic to be produced. For example, if 5 percent (by weight of the resultant composition) of etherized phenol plasticizer be incorporated with, say, the prolamine zein, the plasticized product is hard and tough in character. When on the other hand, increasingly greater percentages of such plasticizer are incorporated with the zein, the resultant compositions exhibit increased flexibility and softness such that at a content of 50 percent by weight in the product the plastics often resemble many rubber articles. When 80 to 95 percent by weight of the resultant composition is such plasticizer, the products are permanently soft and tacky. Fundamental product characteristics may be regarded, then, as a function of plasticizer content, and it therefore follows that the amount of plasticizer to be incorporated with a prolamine will be determined by the use to which the product is to be put. Further, it is apparent that not all of the etherized phenols are of equal effectiveness as already pointed out, and that, by suitable choice of such phenols, more or less hard plasticized prolamine compositions may be made with a given amount of plasticizer, depending upon which plasticizer is employed. It is evident, then, that a wide range of plasticized compositions is obtainable by means of this discovery, and, further, that product characteristics may be modified at will by judicious choice of the quantity of plasticizer incorporated with the prolamine.

The plasticized compositions resulting from practice of this invention have been found of versatile utilities not only as plastic rods, sheets and molded articles, but also as coatings of various types. Thus, for example, these compositions may be made into solutions and applied as a sizing; utilized for impregnating and coating, particularly for grease and water-proofing purposes, and applied to the production of flexible films, lacquers, wall and floor paints, deck enamels, grease and moisture-proof lacquers for application to metallic surfaces, protective varnishes for printed and other paper surfaces, adhesives, laminated products of various types, plastic compositions, linoleum, oilcloth, and the like.

These uses are, of course, cited as being illustrative only of the diverse applications of the novel compositions, and as in no way imposing limitations thereon, there being many related and other uses which will at once be apparent to those skilled in such arts.

In practicing this invention, the optimum quantities of plasticizer to be incorporated to secure the qualities desired for the use to which the resultant composition is to be put, will at once be apparent to those skilled in the respective arts from the further description and examples hereinafter set forth.

As a general procedure, the prolamine and plasticizer may be thoroughly mixed in the desired proportions at room temperature. The mixture may then be heated and maintained at a more or less elevated temperature until homogeneity has been attained, as evidenced by disappearance of the prolamine and plasticizer as individual entities with consequent formation of a single homogeneous mass. This may be carried out in internal mixing machines or upon plastic milling rolls. Pigments, dyes, fillers, resins and the like may be added to the masses while in these machines.

Upon cooling to room temperature, the plasticized composition will be more or less hard and pliable, depending upon the amount and nature of plasticizer incorporated therein, as hereinabove set forth. In the incorporation of other materials with plasticized prolamine compositions for the production of lacquers, sizing, coating or impregnating materials, printing inks, adhesives, or the like, it is frequently advantageous to mix all of the individual components thereof including solvents at the outset of operations, rather than to plasticize the prolamine preliminarily and thereafter to incorporate the plasticized product with the other compounding materials, although such may be done. However, the sequence of such operations is not at all critical, and in general will be governed by the character of the technical operations involved, by the arrangement thereof which results in optimum process economies, and by the established production methods conventionally practiced in each particular industry.

As hereinabove set forth, the plasticizers of the present invention may be employed, alone or in conjunction with other known plasticizers, for various plastic modified prolamine compositions, such, as for example, aldehyde-reacted prolamine plastics. It is well known to react prolamines with aldehydes, particularly formaldehyde, to form solutions, coatings, and thermosetting plastic compositions of improved water resistance and widely varying properties depending upon the nature and amount of ingredients incorporated therein, and upon the temperature and duration of aldehyde reaction. If desired, the plasticized prolamine compositions of this invention may be aldehyde-cured according to conventional technique, to result in useful plastics and coating compositions which, after curing, are no longer thermoplastic, but are thermosetting in nature, and by reason of the plasticizers set forth in the present invention are flexible and tough. It is apparent that while aldehyde curing operations with plastics and coatings are preferably carried out upon conclusion of plasticization of the prolamine material, it is possible to add the plasticizers to solutions of prolamines which have been first reacted with the aldehydes.

As is well-known, the prolamines are a group of proteins characterized by solubility in aqueous alcohol solutions which are found only in certain cereal grains. The well-known prolamines include zein, found in corn, gliadin, found in wheat, hordein, found in barley, secalin from rye, sorghumin from sorghum, and the alcohol-soluble protein extractable from oats. The prolamines constitute a large portion of the protein found in the starchy or endosperm parts of the cereal grains and the proteins are isolated from such starchy portions after the grains have been degerminated, as for example in cornstarch manufacture by the wet-milling process or in the manufacture of wheat or other flours by the dry-milling process. The starches may be removed by mechanical washing action as in the preparation of wheat gluten, by wet kneading of the floury mixture, or they may be removed as in the commercial separation of cornstarch. The protein concentrates thus secured may then be extracted by aqueous alcohol or otherwise treated to produce more concentrated or purified alcohol-soluble prolamines as is well-known in the art for producing zein and gliadin. These various prolamines may be used to manufacture prolamine compositions and plastic products and be cured with formaldehyde. Certain modifications of the prolamines have become available, such as for instance zein acetate, or zein modified by heat and water-vapor or water treatment; these may be plasticized with the compounds of the present invention and when compositions or plastics are formed of these with aldehydes the resultant compositions may likewise be plasticized with the ether phenols of this invention.

Prolamine plastic compositions may also be formed from the crude protein concentrates derived directly from the de-germinated cereals when these contain a considerable proportion of a prolamine. Thus, as a suitable corn protein for forming plastics, there may be used the corn gluten resulting from the commercial separation of cornstarch in the wet-milling process, which may contain from 40 to 65% of corn proteins primarily of prolamine nature, a large part being the alcohol-soluble prolamine zein. The non-protein remainder of the gluten consists primarily of starch with small quantities of cellulosic bodies and fatty substances. Partially purified corn glutens such as those produced in Shildneck Patent U. S. No. 2,274,004 by further removal of starch with acids or as shown in Schopmeyer patent, U. S. No. 2,310,104, wherein fatty materials are removed and which contain 60 percent to 100 percent protein content, can obviously be used in making cured corn protein compositions and plastics and aldehyde-cured products, which may be further modified with the plasticizers of the present invention. It will be understood that as the term "prolamine-base" protein is used in the description here given and in the appended claims, there is included by such term not alone the purified prolamines isolated from the various cereal grains, but also cereal protein products and mixtures of cereal proteins produced from the endosperm which contain a considerable proportion of prolamine, and there is also included by such term modified or chemically altered prolamines and aldehyde-cured prolamine products.

The following examples will serve to illustrate, to a more or less limited extent, the scope of the present invention, and the presently more important practical applications thereof. It is to be explicitly understood that the present invention is in no way limited to the applications thereof set forth in these examples, nor to the particular ingredients or to the amounts therein specified, since equivalent ingredients in varying percentages may be used for these and other applications, as will be readily apparent to those skilled in such arts. Thus, for instance, in those examples in which individual solvents or solvent mixtures are employed, it will be understood that any solvent or solvent mixture exhibiting solvency for the prolamine and for the plasticizer will function adequately as a mutual solvent for the unplasticized and for the plasticized prolamine materials. Thus, for example, ethylene glycol monomethyl ether, aqueous ethyl alcohol, aqueous isopropyl alcohol, aqueous diacetone alcohol, diethylene glycol monoethyl ether and diethylene monomethyl ether, are individually solvents both for zein and for the plasticizers of this invention, and therefore function, either separately or in combination, as solvents for both unplasticized and plasticized prolamine materials. Other solvents such as toluene may be added in certain amounts to such solvent mixtures for certain desirable purposes functioning as auxiliary solvents of which many are known in the prolamine solvent field.

Example 1

Seventy parts by weight of zein and 30 parts by weight by m-methoxyphenol were placed in a jacketed internal plastic mixer of the dough type used in the rubber industry and thoroughly mixed at room temperature. m-Methoxyphenol is a liquid boiling at a temperature of 244.3° C., and soluble to a limited extent in water. The agitated mix was then heated to a temperature not exceeding 130° C., and maintained at a temperature in the general range 100° to 130° C., for a period of about 60 minutes, at which time plasticization of the zein had already been substantially completed as evidenced by disappearance of the zein and m-Methoxyphenol as separate entities resulting in a uniform homogeneous plastic solution. Upon cooling to room temperature this product was found to be clear, transparent, substantially colorless and uniform when viewed in sections. It was a thermoplastic composition, which could when again heated be extruded and molded into formed plastic articles, such as plastic tubes, doorknobs, toys and the like. These plastic articles were tough and could be deformed and fractured only with difficulty.

Example 2

By weight 10 parts of 2,6-dimethoxyphenol, 5 parts of p-octyloxyphenol, 15 parts of oleic acid, and 10 parts of dibutyl tartrate were thoroughly mixed at room temperature. 2,6 - dimethoxyphenol is a solid melting at a temperature of 55° to 56° C., boiling at about 260° C., and soluble in water to the extent of forming a solution of about 1.8 percent strength at 13° C. p-Octyloxyphenol is a solid melting in the range 60–61° C., and soluble to a certain extent in water. The resultant mixture was heated in a jacketed mixer to a temperature in the general range from 120° C. to 135° C., while 60 parts of zein was gradually mixed in during the course of an hour. The plastic dough was further worked for a period of about 20 minutes, at which time a clear, homogeneous plastic solid solution has resulted and plasticization of the zein was substantially complete. Upon cooling a small portion to room temperature the product was found to be a clear, homogeneous, substantially transparent and colorless thermoplastic composition, relatively tough and pliable at ordinary temperatures, and thus directly usable as a plastic. When cooled to below 70° C., there was incorporated in the main plastic batch 30 parts by weight of rosin and thereafter 1 part of trioxymethylene. The batch was then sheeted on rubber-sheeting rolls and pieces were inserted into a mold of a suitable shape and the pieces were then pressed in a heated press at 250 lbs. per square inch at 135° C., for one half hour. This gave plastic articles generally similar to those produced by Example 1 but distinguished therefrom by not being thermoplastic and by having greater water-resistance.

Example 3

A plastic suitable for use as laboratory tubing was made by mixing in an internal mixer the following ingredients:

| | Parts by weight |
|---|---|
| Zein | 37 |
| o-Ethoxyphenol | 20 |
| Clay | 12 |
| Carbon black | 5 | o-Ethoxy phenol melts at 29° C., boils at a temperature of about 217° C., and is slightly soluble in water. The zein and plasticizer were first entered into the internal mixer and after working for approximately one hour the pigments were added in small portions at a time to provide a homogeneous mixture. The working of the mass readily provided heat, and it was then cooled to below 80° C., by a water-cooled jacket upon the internal mixer. The plastic mass was then extruded to form a flexible, plastic tubing which exhibited good oil and grease resistance, and was otherwise suitable as a laboratory tubing.

Example 4

As an example wherein there is employed a crude mixture of cereal proteins containing prolamines, hard prolamine plastic articles such as doorknobs of a black color were made by molding under similar conditions to those used in Example 3 masses of the following plastic mixture:

| | Parts by weight |
|---|---|
| Corn gluten, 60% protein content | 40 |
| "Nevillac 10°" (coumarone indenephenol resin)[1] | 35 |
| 5-methoxy-2-naphthol | 5 |
| o-Lauryloxy phenol | 5 |
| Asbestine | 8 |
| Channel black | 5 |
| Trioxymethylene | 8 |

[1] Composition unknown, except that it is one or more condensation products of paracoumarone, indene, or coal tar cuts rich in these, with phenol, generally with sulfuric acid as a catalyst.

In making the plastic mixture the plasticizers, resin and gluten were first mixed in a plastic masticating machine. The pigments were then incorporated by adding small portions at a time and the mass worked until it was thoroughly uniform. While still in the plastic machine, the mass was then cooled to 75° C., and the trioxymethylene quickly introduced. After further working for approximately five minutes to distribute the formaldehyde compound uniformly throughout the mass it was removed from the mixer and sheeted in milling rolls prior to actual molding operations at temperatures above 120° C.

Example 5

By weight 40 parts of zein, 45 parts of m-propoxy phenol, and 15 parts of Number 35-B oil (a wood distillation fraction containing etherized phenols), were dissolved at room temperatures in a solvent mixture consisting of about 30 parts by weight of methyl Cellosolve and about 70 parts by weight of 95% (by volume) ethyl alcohol. The resulting solution was found to be directly applicable for many uses; for example, for sizing, coating, impregnating and waterproofing textiles, paper, wood, plaster, tinplate, and the like. As a coating material, the solution was eminently suited for application to varnished, lacquered, and the like surfaces. Further, it was found to form removable, strong, tough, pliable, transparent films when cast upon an oiled or waxed glass surface. In addition to these properties, the films were oil-resistant, hard and non-tacky in nature, and furnished an excellent coating for printed surfaces. When applied to paper there resulted excellent grease- and moisture-proof coatings, giving flexible wrappings suitable for packaging. Coated upon tinplate the coating was found to withstand can-forming operations and repeated flexing without cracking. The coating was excellent in grease resistance. Number 35-B oil may readily be replaced by a similar ether phenol mixture resulting from hardwood distillation and identified by Tennessee Eastman Corporation as Heartcut Number 3-A oil.

Example 6

By weight 20 parts of cereal gluten derived from corn, 30 parts of beechwood creosote derived from the tar secured in the destructive distillation of beechwood and known to contain mixtures of phenol, chiefly guaiacol and creosol, 10 parts of p-octyloxyphenol, 10 parts of tetraethyleneglycol and 25 parts of carbon black were thoroughly ground together on a roller mill. The resultant product was found to be suited for use as an ink for printing cotton bags.

Example 7

By weight 47 parts of zein, 47 parts of m-butoxyphenol, 6 parts of 2,6-dimethoxyphenol, about 100 parts of 80% (by volume) aqueous ethyl alcohol and 30 parts ethyl lactate were thoroughly mixed and ground in a ball mill for a period of about 24 hours. The resultant composition was knife-coated onto a rubber sized sheeting base, which was then force-dried for about 1 hour at a temperature of about 150° F. The resultant coated fabric exhibited excellent wearing qualities, resistance to flexing and to the action of water, acids, and greases.

Example 8

3-methoxypyrocatechol is a solid melting in the range from 38° to 41° C., boiling at a temperature of 146° C. under a pressure of about 15 mm. Hg., and soluble to a limited extent in water. By weight 95 parts of zein, 5 parts of 3-methoxypyrocatechol, 0.1 part oil soluble dyestuff Yellow OB, and about 240 parts of a solvent mixture consisting of 80 parts by weight of diacetone alcohol and 160 parts by weight of 95% (by volume) ethyl alcohol were mixed together overnight in a ball mill. The product was a shellac substitute eminently suited for coating wooden surfaces.

Example 9 p-Ethoxyphenol is a solid melting at 66° C., boiling at a temperature of about 247° C., and very slightly soluble in water. Seventy-five parts by weight of gliadin and 25 parts by weight of p-ethoxyphenol were thoroughly mixed at room temperature. The resultant mixture was heated to a temperature of about 127° C., and maintained at a temperature in the general range from 120° C. to 135° C., for a period of about 35 minutes, at which time a clear, homogeneous solution indicating complete plasticization of the gliadin had resulted. Upon cooling to room temperature a clear, transparent, substantially colorless, thermoplastic product resulted. When dissolved at room temperature in a volatile solvent mixture consisting of about 65 parts by weight of 95% (by volume) ethanol, about 20 parts by weight of glacial acetic acid, and about 15 parts by weight of water, the resultant composition exhibited excellent properties as a quick-drying adhesive. In place of the 75 parts of gliadin a similar glue may be made by substituting 75 parts of hordein.

Example 10

Forty-five parts by weight of o-amyloxyphenol, 10 parts by weight of carbon black, and 20 parts by weight of whiting were mixed together and thoroughly ground on a roller mill. With the resultant mixture were incorporated, at room temperature, 55 parts by weight of zein acetate and about 150 parts by weight of a solvent mixture consisting of about 45 parts by weight of ethylene glycol monomethyl ether and about 105 parts by weight of isopropyl alcohol. The resultant homogeneous product was knife-coated onto a nitrocellulose sized fabric base. The impregnated fabric was then baked at a temperature within the general range from 170° to 180° F., for a period of about 2 hours. The resultant material was a dull black artificial leather.

*Example 11*

Twenty grams of zein were dissolved in 50 ml. of 95% (by volume) ethyl alcohol and 18 ml. of commercial aqueous formalin (40% by volume), and the solution was treated in an autoclave at 15 lbs. steam pressure or 121° C., for 1 hour. To the solution of prolamine reaction product thus produced there was then added 10 grams of dibutyl tartrate and 1.5 grams of 2-methoxy-4-methyl phenol. 2-methoxy-4-methyl phenol (creosol) melts at 5.5° C., boils at a temperature of about 221.8° C., and is slightly soluble in water. Upon coating the lacquer thus produced upon tinplate flexible clear coatings were secured which when further heated for 3 hours at a temperature above 130° C., became quite water-resistant as well as grease resistant and highly flexible.

*Example 12*

To 7 parts by weight of a 63 percent solids solution of the sodium salts of a sulfonated fatty acid and rosin mixture such as is secured as a by-product in sulfate paper pulp digestion, and sold as sulfonated "Indusol," there was added 74 parts by weight of water, 2 parts by weight of urea, 1 part by weight of borax, and 7 parts by weight of p-methoxyphenol. p-Methoxyphenol is a solid melting at 53° C., boiling at a temperature of about 243° C., and soluble in water. There was then introduced into this solution 15 parts by weight of a destarched, de-oiled corn gluten analyzing 73 percent protein content and 1 part by weight of lampblack, and the whole slowly heated with continuous agitation to a temperature of about 165° F. After being maintained at a temperature in the general range from 160° to 170° F., for about 2 hours, the mixture had become a smooth paste. The mixture was satisfactorily employed as an interior wall paint, preferably after adding per one part by weight thereof 0.5 part by weight of water.

*Example 13*

A zein dispersion in water with ammonium rosinate was prepared according to the method of Drewsen and Little (U. S. Patent No. 2,247,531) as follows: first, a paste of zein and aqueous ammonia was prepared in a mechanical mixer by incorporating therein 4 parts by weight of zein, 6 parts by weight of water and 1 part by weight of aqua ammonia (26° Bé). Then a stiff homogeneous mixture of ammonium rosinate was prepared by thoroughly mixing for several hours at an elevated temperature not in excess of 200° F., 4 parts by weight (dry basis) of papermaker's rosin and about 1 part by weight of aqua ammonia (26° Bé). The prepared zein paste and ammonium rosinate were then thoroughly mixed, resulting in a zein rosinate composition. There was then added to the mix thus prepared 2 parts by weight of 2-allyloxymethyl phenol to act as a plasticizer. This etherized phenol was readily emulsified and dissolved into the mix. This was then employed to claycoat paper by first mixing it with a clay dispersion. A suitable clay dispersion was prepared by slurrying together 400 parts by weight of kaolin, 200 parts by weight of water and 5.5 parts by weight of sodium pyrophosphate. To 3 parts by weight of the clay slurry there was then added 1 part by weight of the plasticized zein dispersion, and the resulting coating product was screened. This material exhibited excellent qualities as a paper coater and gave a claycoated paper of satisfactory adhesion and wax pick test.

The foregoing description and examples will point out that the invention is subject to numerous embodiments not herein illustrated, but falling within the scope of the appended claims.

I claim:

1. A plasticized "prolamine-base" protein composition comprising plasticized "prolamine-base" protein having as plasticizer therefor ether phenol in which the total number of carbon atoms in the molecule is not in excess of 18.

2. A plasticized prolamine composition comprising plasticized zein having as plasticizer therefor ether phenol in which the total number of carbon atoms in the molecule is not in excess of 18.

3. A plasticized "prolamine-base" protein composition comprising plasticized prolamine-containing cereal gluten having as plasticizer therefor ether phenol in which the total number of carbon atoms in the molecule is not in excess of 18.

4. A plasticized "prolamine-base" protein composition comprising plasticized "zein- base" protein and having as plasticizer therefor ether phenol in which the total number of carbon atoms in the molecule is not in excess of 18.

5. A plasticized prolamine composition comprising plasticized prolamine having as plasticizer therefor ether phenol in which the total number of carbon atoms in the molecule is not in excess of 18.

6. A plasticized "prolamine-base" protein composition consisting of plasticized "prolamine-base" protein having as plasticizer therefor ether phenol in which the total number of carbon atoms in the molecule is not in excess of 18.

7. A plasticized "prolamine-base" protein composition comprising from 5 to 95 parts by weight of plasticized "prolamine-base" protein having as plasticizer therefor from 95 to 5 parts by weight of ether phenol in which the total number of carbon atoms in the molecule is not in excess of 18.

8. A plasticized prolamine composition comprising from 5 to 95 parts by weight of plasticized zein having as plasticizer therefor from 95 to 5 parts by weight of ether phenol in which the total number of carbon atoms in the molecule is not in excess of 18.

9. A plasticized "prolamine-base" protein composition comprising from 5 to 95 parts by weight of plasticized prolamine-containing cereal gluten having as plasticizer therefor from 95 to 5 parts by weight of ether phenol in which the total number of carbon atoms in the molecule is not in excess of 18.

10. A plasticized "prolamine-base" protein composition comprising from 5 to 95 parts by weight of plasticized "zein-base" protein having as plasticizer therefor from 95 to 5 parts by weight of ether phenol in which the total number of carbon atoms in the molecule is not in excess of 18.

11. A plasticized prolamine composition comprising from 5 to 95 parts by weight of plasticized prolamine having as plasticizer therefor from 95 to 5 parts by weight of ether phenol in which the total number of carbon atoms in the molecule is not in excess of 18.

12. A "prolamine-base" protein composition in solution form comprising dissolved "prolamine-base" protein, as plasticizer therefor dissolved ether phenol in which the total number of carbon atoms in the molecule is not in excess of 18, and a volatile mutual solvent for said materials.

13. A "prolamine-base" protein composition comprising by weight and in solution form from 5 to 95 parts of dissolved "prolamine-base" protein, as plasticizer therefor from 95 to 5 parts of dissolved ether phenol in which the total number of carbon atoms in the molecule is not in excess of 18, and a volatile mutual solvent for said materials.

14. A prolamine composition comprising by weight and in solution form from 5 to 95 parts of dissolved prolamine, as plasticizer therefor from 95 to 5 parts of dissolved ether phenol in which the total number of carbon atoms in the molecule is not in excess of 18, and a volatile mutual solvent for said materials.

15. A prolamine composition comprising in solution form dissolved zein, as plasticizer therefor dissolved ether phenol in which the total number of carbon atoms in the molecule is not in excess of 18, and a volatile mutual solvent for said materials.

16. A plasticized prolamine composition consisting of plasticized zein having as plasticizer therefor ether phenol in which the total number of carbon atoms in the molecule is not in excess of 18.

17. A plasticized "prolamine-base" protein composition consisting of plasticized prolamine-containing cereal gluten having as plasticizer therefor ether phenol in which the total number of carbon atoms in the molecule is not in excess of 18.

18. A plasticized "prolamine-base" protein composition consisting of plasticized "zein-base" protein having as plasticizer therefor ether phenol in which the total number of carbon atoms in the molecule is not in excess of 18.

19. A plasticized prolamine composition consisting of plasticized prolamine having as plasticizer therefor ether phenol in which the total number of carbon atoms in the molecule is not in excess of 18.

20. A plasticized prolamine composition comprising plasticized hordein having as plasticizer therefor ether phenol in which the total number of carbon atoms in the molecule is not in excess of 18.

21. A plasticized prolamine composition comprising plasticized gliadin having as plasticizer therefor ether phenol in which the total number of carbon atoms in the molecule is not in excess of 18.

22. A plasticized prolamine composition consisting of plasticized hordein having as plasticizer therefor ether phenol in which the total number of carbon atoms in the molecule is not in excess of 18.

23. A prolamine composition comprising in solution form dissolved gliadin, as plasticizer therefor dissolved ether phenol in which the total number of carbon atoms in the molecule is not in excess of 18, and a volatile mutual solvent for said materials.

24. A prolamine composition comprising in solution form dissolved hordein, as plasticizer therefor dissolved ether phenol in which the total number of carbon atoms in the molecule is not in excess of 18, and a volatile mutual solvent for said materials.

WILLARD L. MORGAN.

REFERENCES CITED

The following references are of record in the file of this patent:

UNITED STATES PATENTS

| Number | Name | Date |
|---|---|---|
| 600,556 | Schupphaus | Mar. 15, 1898 |
| 2,115,716 | Hansen | May 3, 1938 |
| 2,121,723 | Bass et al. | June 21, 1938 |
| 2,135,123 | Coleman et al. | Nov. 1, 1938 |
| 2,185,110 | Coleman | Dec. 26, 1939 |
| 2,193,614 | Alexander | Mar. 12, 1940 |
| 2,205,395 | Coleman | June 25, 1940 |